United States Patent [19]

Pacca

[11] 4,027,912
[45] June 7, 1977

[54] COLLAPSIBLE ROOF-TOP CAMPER

[76] Inventor: Egmar A. Pacca, 6012 Dudman Ave., Garden Grove, Calif. 92645

[22] Filed: May 3, 1976

[21] Appl. No.: 682,777

[52] U.S. Cl. .......................... 296/23 MC; 296/27; 52/64

[51] Int. Cl.² .......................................... B60P 3/34

[58] Field of Search .......... 296/23 MC, 23 F, 23 G, 296/23 H, 23 A, 23 R; 52/66

[56] References Cited

UNITED STATES PATENTS

| | | | |
|---|---|---|---|
| 3,582,131 | 6/1971 | Brown | 296/27 |
| 3,762,759 | 10/1973 | Hall | 296/23 MC |

Primary Examiner—Philip Goodman
Attorney, Agent, or Firm—Roman A. DiMeo

[57] ABSTRACT

This invention relates to a collapsible roof-top camper comprised of a fixed base provided with a rigid front wall member pivotally secured thereto, said front wall having a second rigid member pivotally attached thereto to form a first roof portion, said roof portion and front wall member having flange elements secured to and extending laterally from the outer side edges thereof, a rigid back wall member pivotally secured to said base, said back wall having a second rigid member pivotally attached thereto to form a second roof portion, said roof portion and back wall member having flange elements secured to and extending laterally from the outer side edges thereof, said second roof portion being provided with its forward edge extending longitudinally therefrom to form a continuous flap under which the forward edge of the first roof portion is accommodated thereby forming a weather seal, a first and a second side wall pivotally secured to said base at opposite edges thereof, said side walls adapted to abut against the flange elements carried by the front and back wall members and their respective roof portions to form weather seals.

10 Claims, 17 Drawing Figures

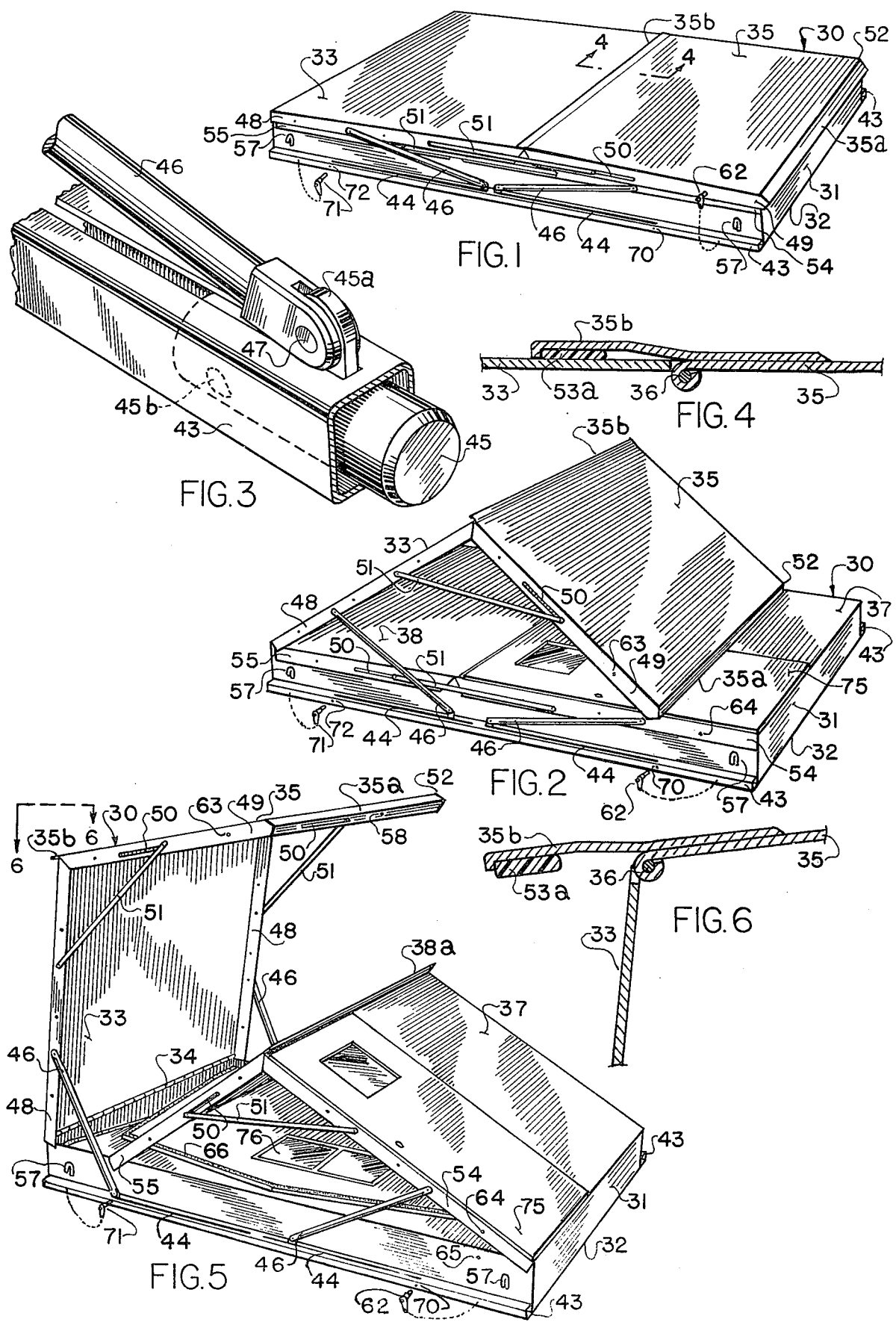

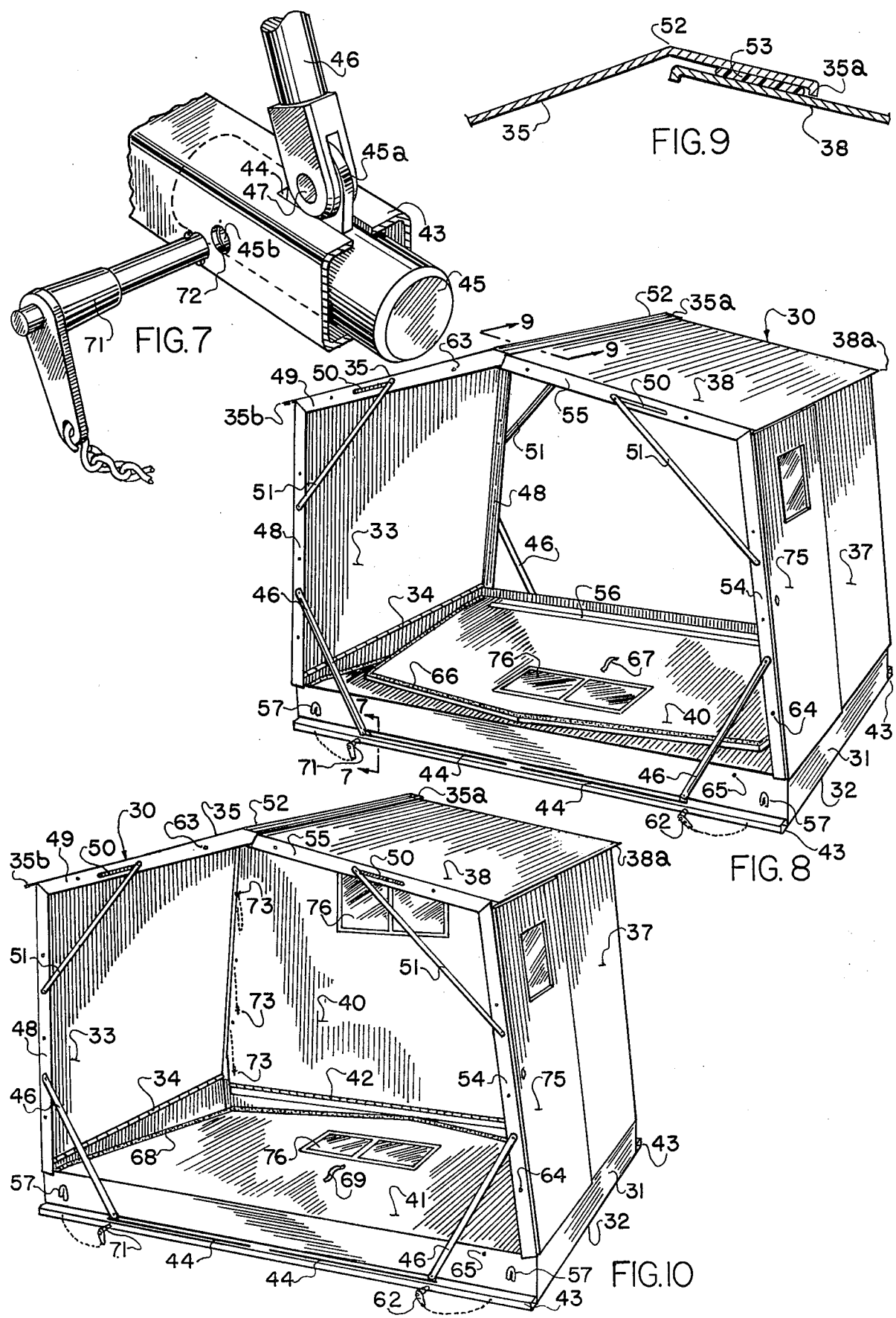

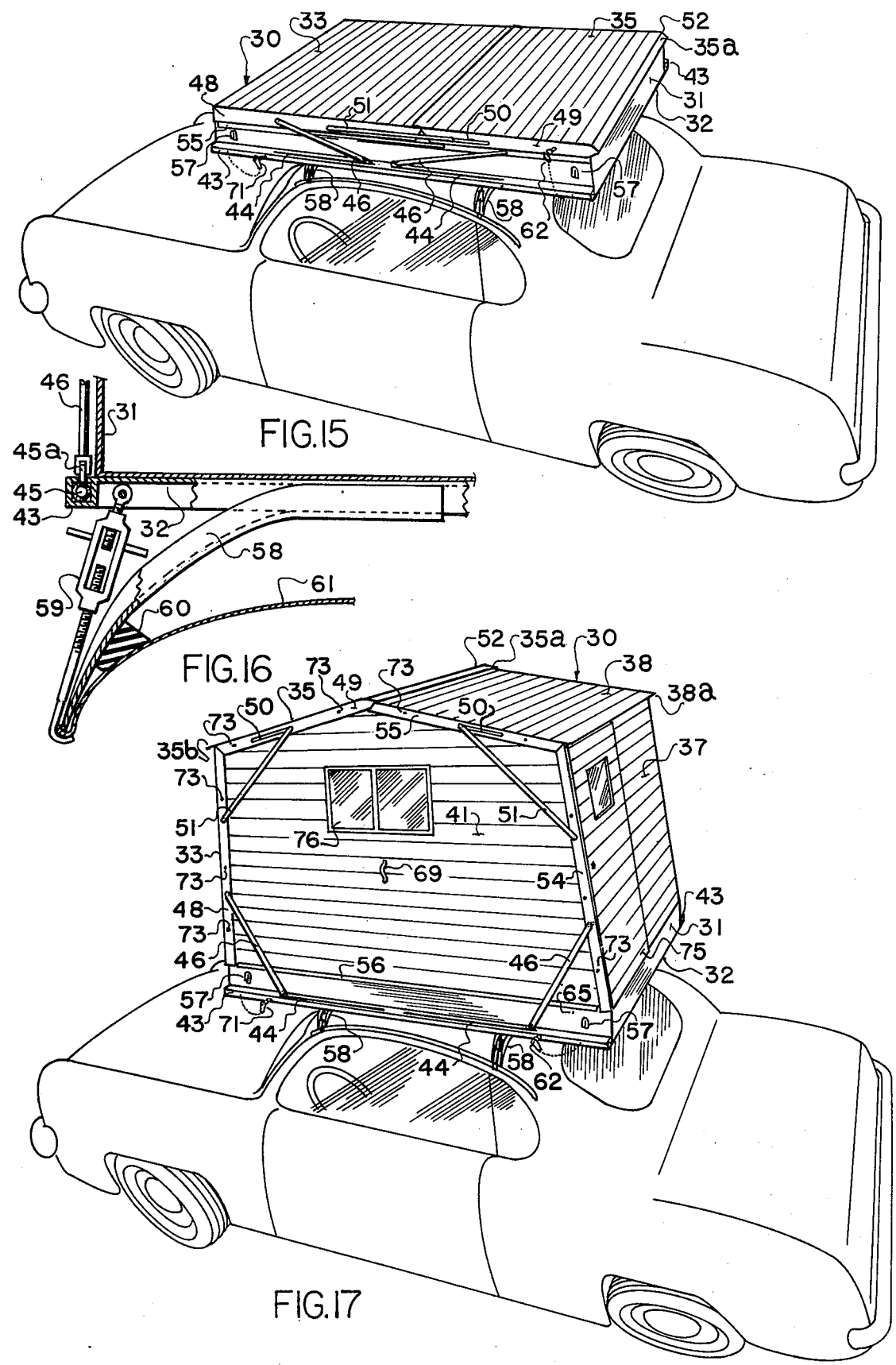

COLLAPSIBLE ROOF-TOP CAMPER

This invention relates to a collapsible roof-top camper, and more particularly relates to a collapsible roof-top camper which can be easily erected on the roof of a transporting vehicle and be collapsed to form a low profile, compact unit for roadway travel or garage storage.

The worldwide energy crisis has changed the course of the automobile industry towards production of less fuel consuming engines, resulting in less powerful and consequently smaller automobiles. This trend is indicated by the increasing popularity of the compact and subcompact automobile models, thus inevitably changing the course of the recreational vehicle industry towards production of smaller and lighter towed camping trailers, and smaller and lighter car campers.

The majority of the conventional car campers, whether designed to be a fixed or collapsible structure, are engineered to carry the heavy load required by the comfort and conveniences of a conventional house trailer or mobile home, with built-in appliances, stoves, refrigerator, and the like, thus defeating the real purpose of the easiness and readiness that characterizes the requirements for the spur-of-moment decision of a weekend vacation. The aforesaid conventional car campers, because of their fixed and heavy construction, require a relatively complex change in the original structure of a standard automobile to accommodate the bulkiness and the additional load. This cannot be easily resolved, however, without creating the added problem of moving the center of gravity of the vehicle to a dangerously unbalanced position. In addition, conventional car campers, because of their bulkiness and heavy constructin, require a relatively large space for storage and extra precautions to maintain the balance of the vehicle while being loaded or unloaded.

The present invention avoids these and other problems associated with conventional car campers by providing a rigid, habitable camper unit of light-weight construction, which when collapsed is capable of storage in a minimum amount of space, and when expanded, provides a high degree of weather tightness.

The collapsible roof-top camper according to the present invention is comprised of a rectangular, open box-like body, having two side wall panels each provided with sliding windows, namely the inner side wall and the outer side wall. These walls are of the same width as the internal dimension of the longitudinal sides of said rectangular box-like body to which they are pivotally connected. Further, they are positioned opposite to each other and in different horizontal levels so as to permit the outer side wall to overlap the inner side wall and be parallel thereto.

The camper body has an inner end wall pivotally connected by one extremity to one of the narrow sides of the box-like body and pivotally connected to a roof portion at the other extremity. The inner end wall is also provided with an access door. The end wall and roof portion both have edge flanges or borders so as to form a weather tight abutment surface for the side walls. An outer end wall is pivotally connected by one extremity to the opposite narrow side of the box-like body and pivotally connected by the other extremity to an outer roof portion. Both the end wall and roof portion are provided with flanges or edge borders so as to form a weather tight abutment surface for the side walls. Both the outer end wall and connected roof portion have slightly larger dimension than the inner end wall and its connected roof portion, sufficient to envelop said inner end wall and connected roof portion when the latter are in the collapsed condition.

The primary object of the present invention is to provide a collapsible roof-top camper having an all rigid wall and roof panels that can be easily collapsed into a low profile for road travel and for storage in a minimum space.

Another object of the present invention is to provide a collapsible roof-top camper unit wherein the end wall panels, when unfolding to the upright position, are regulated by means of levers pivotally connected by one end to the opposite edges of each of the end wall panels, and the other end to a cylinder traveling within a slotted guiding tubes each attached to the opposite longitudinal walls of the box-like body.

A further object of the present inventin is to provide a collapsible roof-top camper as hereinabove described whereby the roof portions are pivotally connected to their respective end wall panel thereof so that as the wall panels unfold to their upright position, the roof panels automatically elevate into their preset position.

A further object of the present is to provide a collapsible roof-top camper with a high degree of weather tightness in either its collapsed or upraised conditions.

A further object of the present invention is to provide a collapsible roof-top camper which can be upraised and collapsed without the help of tools of any kind, and eliminating the need for separately assembling and disassembling each component part of the framework.

Other objects and advantages will become apparent from the following description taken in conjunction with the accompanying drawing, in which:

FIG. 1 is a perspective view of the collapsible roof-top camper shown in its compact or collapsed position;

FIG. 2 is a view similar to FIG. 1 but showing the camper in a partially unfolded position;

FIG. 3 is a fragmentary, perspective view showing the traveling cylinder and lever that connects the outer and inner end wall panels to the slotted guiding tubes;

FIG. 4 is a fragmentary cross-sectional view of the weather-seal means of a roof panel portion in a collapsed position, taken along line 4—4 of FIG. 1;

FIG. 5 is a perspective view similar to FIG. 2 illustrating a later stage in the unfolding of the camper, showing the outer end wall and its roof portion in the final raised position, and the inner end wall being unfolded;

FIG. 6 is a fragmentary, cross-sectional view of the weather-seal means taken along line 6—6 of FIG. 5;

FIG. 7 is a perspective view taken along line 7—7 of FIG. 8 illustrating the traveling cylinder and lever positioned at the end of the slot on the guiding tube, and also showing a locker pin means;

FIG. 8 is a perspective view illustrating the camper end walls and roof portions completely unfolded and positioned;

FIG. 9 is a fragmentary, cross-sectional view of the roof ridge taken along line 9—9 of FIG. 8 showing the weather-seal means;

FIG. 10 is a perspective view illustrating one of the side walls in the raised position, and the other lying flat on the floor of the body;

FIG. 15 is a pictorial view of the roof-top camper in its compact or collapsed roadway condition, mounted on the roof of an automobile;

Figures 11, 12:
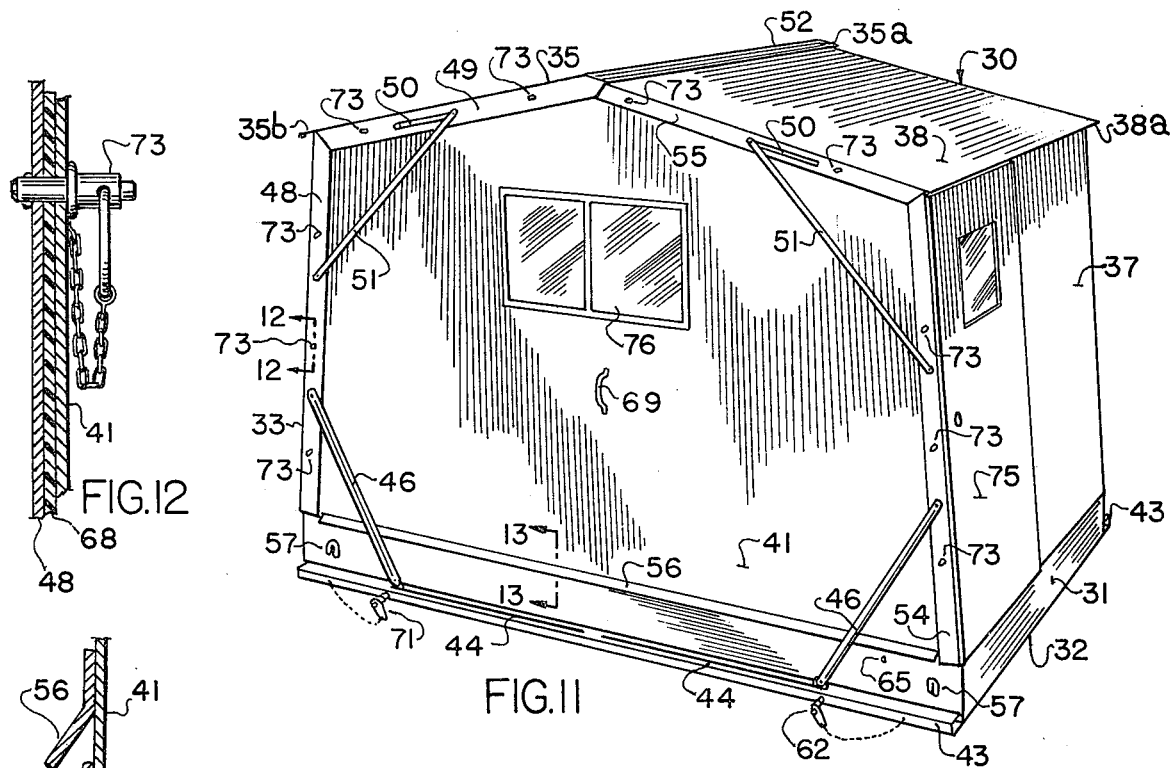
FIG. 11 is a perspective view showing the roof-top camper in its complete upraised condition.
FIG. 12 is a fragmentary, cross-sectional view of the fastening pin means taken along line 12—12 of FIG. 11.
Figures 13, 14:
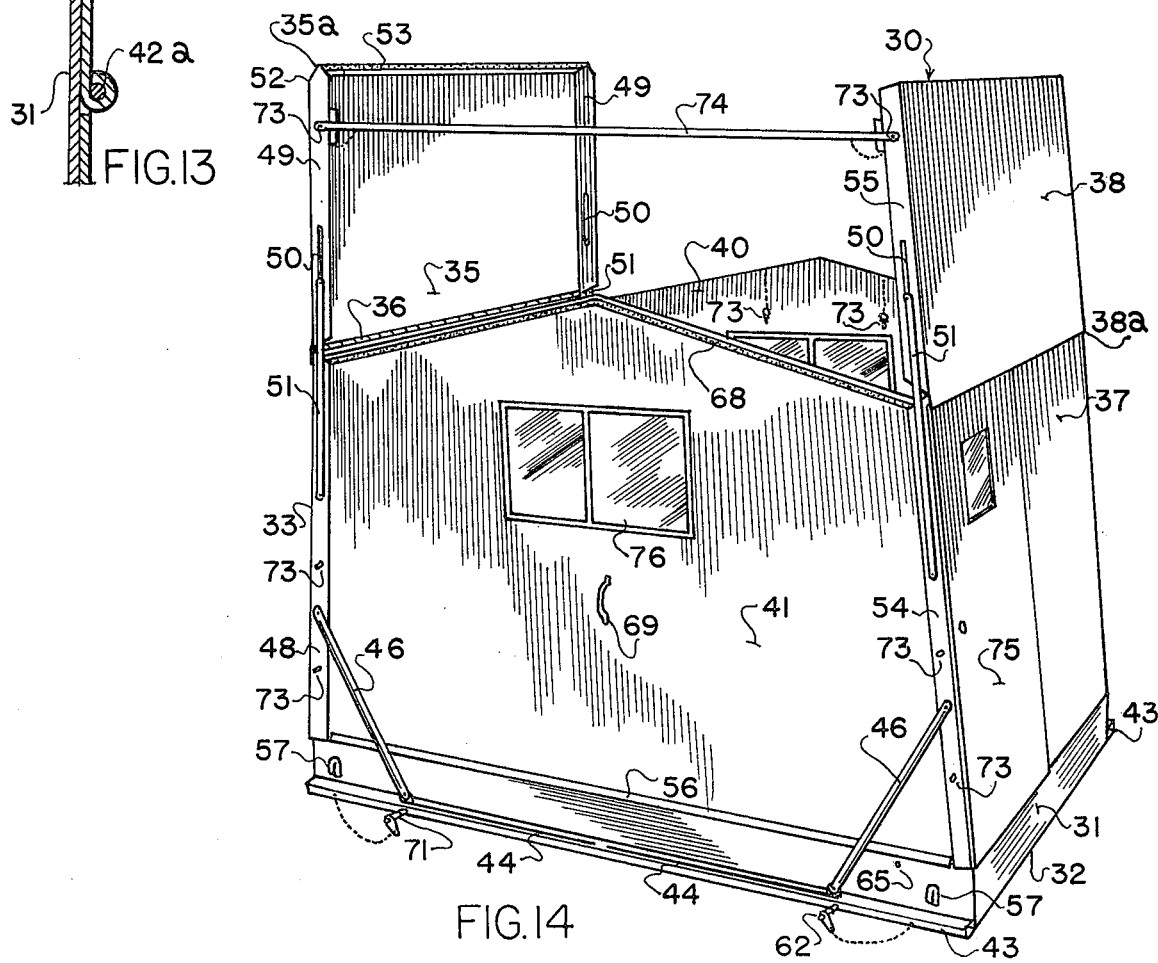
FIG. 13 is a fragmentary, cross-sectional view of the weather protection means taken along line 13—13 of FIG. 11.
FIG. 14 is a perspective view of the roof-top camper with its roof portions lifted in straight alignment with the end walls to provide a skylight opening.

FIG. 16 is a fragmentary, cross-sectional view of the roof-top detachable mounting means; and FIG. 17 is a prictorial view of the collapsible roof-top camper shown in FIG. 15 in its upraised position mounted on the roof of an automobile. Referring to FIGS. 1, 2, 5, 8, 10, 14 and 17, reference numeral 30 designates generally the collapsible roof-top camper of the instant invention which is provided with a fixed body portion 31 having a floor 32 and vertically extending side and end walls so as to form a shallow open-top box-like structure. Body portion 31, including the floor 32 of the camper 30, constitutes the main platform for detachably mounting said camper on the roof of any automobile or any similar vehicle.

An outer end wall 33 is pivotally connected to the upper extremity of one of the end walls of body portion 31 by hinge means 34, and is pivotally connected to an outer roof portion 35 by hinge means 36 (as best seen in FIGS. 4 and 6). An inner end wall 37 is pivotally connected to a vertical end wall of body portion 31, but below the upper extremity thereof, opposite the first-mentioned end wall, by hinge means 37a (not visible) and is pivotally connected to an inner roof portion 38 by hinge means 39 (not visible). Hinge means 37a and 39 are similar in structure and purpose to hinge means 34 and 36, respectively. The reason for vertically offsetting the hinge means 34 of end wall 33 and hinge means 37a of end walll 37 is to allow end walls (and concomitantly) their respective roof portions to overlap and lie in a substantially horizontal position when they are in a collapsed state. So that the height of the end walls are uniform when in the upright position, inner end wall 37 must, of necessity, have a greater height than outer end wall 33.

An outer side wall 40 and an inner side wall 41 are pivotally connected to opposite vertical side walls of body portion 31 by hinge means 42 and 42a, respectively. It should be noted that the hinge means 42 of outer end wall 40 is vertically offset with respect to hinge means 42a of inner side wall 41 so that when the side walls 40 and 41 are in their collapsed state, they will overlap and lie in a substantially horizontal position. Obviously, the height of inner side wall 41 is greater than the height of outer side wall 40 so that the combined height of the vertical side wall of body portion 31 up to the juncture of hinge 42a and inner side wall 41 is equal to that of vertical side wall of body portion 31 and outer side wall 40 secured thereto.

At the lower extremity of each vertical side wall of body portion 31 and extending along said extremity, is a hollow tube members 43. Hollow tube members 43 are provided with a pair of slot means 44, each of which houses a cylinder 45. Connector rod 46 is pivotally connected to cylinder 45 by pin means 47. Pin means 47 are accommodated within cylinder extension 45a which pass through slot means 44 and are in slideable relationship therewith. (See FIG. 3).

Outer end wall 33 is provided with laterally extending flanges 48 projecting from each of the side edges thereof. Outer roof portion 35, which is pivotally secured to outer end wall 33, is also provided with laterally extending flanges 49 from each of the side edges thereof. Flanges 48 and 49 thus provide abutment surfaces against which the side walls of the camper are positioned so as to create tight weather-seal means when said side walls are in their up-right position.

Each flange 49 of the outer roof portion 35 is also provided with a longitudinal slot 50. One end of connecting arm 51 is in slideable engagement with each slot 50. The opposite end of each arm 51 is pivotally secured to opposite flanges 48 of outer end wall 33. Likewise, the end of each connecting rod 46 which is opposite to the end pivotally secured to cylinder 45, is also pivotally attached to flange 48.

The forward edge of outer roof portion 35 is bent downwardly so that an apex 52 is formed thereby providing a peak or ridgeline of the roof when the camper is in its fully raised position. Secured to the underside of the lead edge 35a of outer roof portion 35 are weather strip means 53. (See FIG. 9). Thus, when inner end wall 37 and inner roof portion 38 are completely extended into their fully raised position, lead edge 35a, and concomitantly weather strip means 53, are tightly compressed against the outer surface of the forward edge of inner roof portion 38, thereby forming a tight weather-seal of the camper roof when said camper is fully erected.

The hinged end of outer roof portion 35 is provided with an overhang 35b. Secured to the underside of overhang 35b and extending along the edge of said overhang, is weather stripping means 53a. (See FIG. 6). When the camper is in its folded position, overhang 35b is tightly compressed against the outer end wall 33 thereby providing a tight weather-seal. (See FIGS. 1 and 4). It should be noted that overhang 35b also forms an eaves when roof portion 35 is fully erected so as to direct rain or other moisture away from the hinge juncture of the end wall and roof portion, thus protecting the hinge joint from weather and the elements.

From each edge thereof, inner end wall 37 is also provided with laterally extending flange means 54. Further, inner roof portion 38 is provided with laterally extending flange means 55 at each side edge thereof. Flange means 54 carried by inner end wall 37 and flange means 55 carried by inner roof portion 38 provided the same function as do flanges 48 of outer end wall 33 and flanges 49 of outer roof portion 35 when side walls 40 and 41 are in their up-right position.

Furthermore, each flange means 55 carried by inner roof portion 38 is also provided with longitudinal slots 50 to which a connecting arm 51 is slideably attached. Pivotally secured to each flange means 54 of inner end wall 37 is the opposite end of each connecting arm 51 and one end of each connecting rod 46.

Thus, on each side of the camper a connecting rod 46 is pivotally secured to flange 48 of outer end wall 33 and flange 54 of inner end wall 37, while their opposite ends are pivotally connected to separate cylinders 45 housed in slideable engagement within hollow tube members 43. Likewise, on each side of the camper a connecting arm 51 is pivotally secured to flange 48 of outer end wall 33 and flange 54 of inner end wall 37, while their opposite ends are slideably connected to groove 50 in flange 49 and flange 55, respectively.

Inner roof portion 38 is provided at its hinged end with an overhang 38a. Overhang 38a is similar in structure and function to overhang 35b carried by outer roof portion 35.

Side walls 40 and 41 are each provided with a longitudinally extending flange 56 situated adjacent their respective pivot connections to body portion 31. The flange protrudes from each side wall at an angle with respect thereto so as to form a moisture deflecting means thereby weather-proofing said hinge joints. (See FIG. 13).

Secured to body portion 31 of the camper are a plurality of U-hooks 57 which are used to lift the camper (when collapsed) up to a garage ceiling or other similar space by attaching lines thereto and hoisting the collapsed camper upwards thereby resulting in a saving of storage space.

The collapsible roof-top camper is normally placed upon the roof of the transporting vehicle when the camper is in its collapsed position (See FIG. 15). The camper can be secured to the transporting vehicle by any conventional means such as a combination of a curved cross-member bracket 58 to which the camper is secured by any suitable fastening means, i.e., bolts, and a turnbuckle means 59 which is secured at one end to the underside of the vehicle drip channel and the other end by a bolt or the like carried by the camper. (See FIG. 16). If desired a protective rubber block 60 shaped to fit the contour of the roof 61 of the vehicle may be inserted between said roof 61 and bracket 58 to avoid damage to the roof.

When it is desired to erect the collapsible roof-top camper of the invention, (as in FIG. 17), it is necessary to remove two oppositely situated locking pins 62 which lock the camper in its collapsed condition when said pins are introduced through holes 63 on flanges 49 of outer roof portion 35, aligned with holes 64 on flanges 54 of inner end wall 37 and aligned with holes 65 on body portion 31.

By pivoting outer wall 33 outwardly about hinge means 34, the interengagement of the outer roof portion 35 and outer wall 33 by connecting arms 51, concurrently raises roof portion 35. Likewise, by thereafter pivoting inner end wall 37 outwardly about hinge means 37a, inner roof portion 38 is simultaneously raised due to the interengagement thereof with inner end wall 37 by connecting arms 51. That is, when connecting arms 51 slide to the foremost end of slots 50 carried by flanges 49 and 55 of the outer roof portion 35 and inner roof portion 38, respectively, the aforesaid roof portions must, of necessity, be raised into position as their respective outer walls are erected to a full vertical position. The forward edge of inner roof portion 38 is seated in tight compression against weather-strip means 53 carried by the underside of lead edge 35a of outer roof portion 35 so as to form a weather seal.

It should be noted that inner end wall 37 and inner roof portion 38 are slightly narrower than outer end wall 33 and outer roof portion 35 so that the outer members envelope the inner members when the camper is in the collapsed position. Likewise, it should be noted that inner end wall 37 and inner roof portion 38 have slightly larger dimension than the narrow sides of the box-like body 31, sufficient to envelop as to form a lid for said box-like body when the latter is in the collapsed condition.

Outer side wall 40 is next pivotted about hinge means 42 into an erect position so that the weather stripping 66 carried by its border edges are seated against the inner sides of flanges 54 and 48 of inner end wall 37 and outer end wall 33, respectively, and flanges 55 and 49 of inner roof portion 38 and outer roof portion 35, respectively. To facilitate the raising of outer side wall 40 as aforesaid, any satisfactory means may be secured to said side wall such as a conventional handle 67.

After erecting outer side wall 40 to its upright position, inner side wall 41 is then pivotted outwardly about hinge means 42a so that the weather stripping 68 carried by its border edges are seated against the inner sides of flanges 54 and 48 of inner end wall 37 and outer end wall 33, respectively, and flanges 55 and 49 of inner roof portion 38 and outer roof portion 35, respectively. Again, to facilitate the raising of inner wall 41, conventional handle 69 is secured to the outer surface of inner wall 41.

Once the side walls and end walls (and concomitantly their respective roof portions) are fully erected, locking pins 62 are then inserted into holes 70 contained in hollow tube members 43 so as to pass therethrough, and engage holes 45b provided in cylinders 45. Likewise, locking pins 71 are inserted into holes 72 in hollow tube members 43 passing therethrough to engage holes 45b provided in the second pair of cylinders 45. (See FIG. 7). Thus, cylinders 45 are precluded from lineal movement thereby maintaining the outer and inner end walls erect.

In addition, locking pins 73 are inserted through apertures in flanges 48 and 54 of the outer and inner end wall, respectively, and into accommodating apertures in the outer and inner side walls. (See FIG. 12). Likewise, locking pins 73 are also inserted through apertures in flanges 49 and 55 of the outer and inner roofs 35 and 38, respectively, and into accommodating apertures in the upper portion of outer and inner side walls. Accordingly, the outer and inner side walls are secured to the end walls and roof portions, which in turn are maintained erect by locking cylinders 45 in place, as aforesaid, thereby providing a unitary, rigid structure.

If desired, inner roof portion 38 and outer roof portion 35 may be extended substantially in vertical alignment (as in FIG. 14) and provide an open roof for sunbathing during the day or sleeping under the open sky at night. The roof portions are held in their vertical positions by rigid separator rods 74 which interengages said roof portions.

It should be noted that although this embodiment is illustrated to show a door means 75 is inner end wall 37 and window means 76 in the outer and inner walls, said door means and window means can be located in either the end walls or side walls without deviating from the scope of the invention herein.

While one embodiment of the invention has been described, it is understood that the particular embodiment of the invention herein disclosed is for illustrative purposes only and that various changes may be made therein without departing from the principles of the invention.

I claim:

1. A collapsible, roof-top camping structure, comprising:

a body assembly having a floor panel and four vertical panels, each vertical panel being connected to said floor panel along an edge thereof and extending above said floor panel to define a box-like structure having an open top;

a pair of elongated guide-tubes each connected to a first opposing pair of said vertical panels, the longitudinal axis of each such tube being substantially parallel to said floor panel, each such tube having a slotted opening along at least a portion of its length;

a pair of end-wall panels each pivotally connected to a second opposing pair of said vertical panels, each said end-wall panel having a pair of flange means laterally extending toward the opposing end-wall panel;

a plurality of connector rod means, each rod means being rotatably connected at a first end to said flange means carried by one of said end-wall panels and rotatably connected at a second end to a cylinder means whereby each said cylinder means is slideable longitudinally within said guide-tube;

a pair of roof panels, one such roof panel pivotally connected to each said end-wall panel, said roof panel having a pair of flange means laterally extending towards the interior of said box-like structure, and each such flange means having a slotted opening, said roof panels being adapted to rest against one another along their respective leading edges;

a plurality of connecting arms each such arm being rotatably connected at a first end to a flange means carried by an end-wall panel and being slideably connected at a second end within the slotted opening of an adjacent flange means of a roof panel;

a pair of side-wall panels pivotally connected to said first opposing pair of vertical panels, said sidewall panels each being adapted to conform to the openings defined by the flange means of said end-wall panels and the flange means of said roof panels when the leading edges of the roof panels rest against one another;

at least one of said pivotally connected panels having a means for providing access to the interior of said camping structure; and means for detachably mounting said body assembly to the roof of a vehicle.

2. A collapsible, roof-top camping structure as described in claim 1 wherein the bottom edges of one of the end-wall panels is pivotally connected to the top edge of one of the vertical panels by hinge means and the opposite end-wall panel is pivotally connected below the top edge of an opposite vertical panel by hinge means.

3. A collapsible, roof-top camping structure as described in claim 1 wherein the connector rod means are elongated, rigid members.

4. A collapsible, roof-top camping structure as described in claim 1 wherein the connector rod means are hydraulic piston assemblies.

5. A collapsible, roof-top camping structure as described in claim 1 wherein the cylinder means is comprised of a cylinder slideably contained within an adjacent guide-tube.

6. A collapsible, roof-top camping structure as described in claim 1 wherein the roof panels are pivotally connected to the top edges of the end-wall panels by hinge means.

7. A collapsible, roof-top camping structure as described in claim 6 wherein the width of one end-wall panel and its interconnected roof panel is less than the width of the other end-wall panel and its interconnected roof panel.

8. A collapsible, roof-top camping structure as described in claim 1 wherein the connecting arms are elongated, rigid members.

9. A collapsible, roof-top camping structure as described in claim 1 wherein the connecting rod means are pneumatic piston assemblies.

10. A collapsible, roof-top camping structure as described in claim 1 wherein the bottom edges of one of the side-wall panels is pivotally connected to the top edge of one of the vertical panels by hinge means and the opposite side-wall panel is pivotally connected below the top edge of an opposite vertical panel by hinge means.

* * * * *